US005699273A

United States Patent [19]

Hinzpeter et al.

[11] Patent Number: 5,699,273

[45] Date of Patent: Dec. 16, 1997

[54] METHOD AND APPARATUS FOR DETERMINING THE FORCE-DISPLACEMENT DIAGRAM OF THE PAIRS OF PUNCHES OF A ROTARY PELLETING MACHINE

[75] Inventors: Jürgen Hinzpeter; Ingo Schmidt, both of Schwarzenbek; Hans-Joachim Pierags, Lübeck, all of Germany

[73] Assignee: Wilhelm Fette GmbH, Schwarzenbek, Germany

[21] Appl. No.: 590,281

[22] Filed: Jan. 23, 1996

[30] Foreign Application Priority Data

Jan. 28, 1995 [DE] Germany ........................ 195 02 596.2

[51] Int. Cl.$^{6}$ .................................................... G06F 11/32

[52] U.S. Cl. .................... 364/506; 364/505; 364/472.04; 364/476.01; 364/551.02; 73/818; 73/819; 73/862.55; 73/862.07

[58] Field of Search .................................... 364/505–508, 364/472.04, 550, 468.01, 468.05, 468.16, 474.07, 552, 551.01, 551.02, 476.01, 559, 571.01, 571.02, 571.04; 264/40.5, 109, 37, 112, 408; 425/149, 150, 345, 353, 412, 78, 354; 100/41, 43, 50, 903, 905; 72/10.4–10.6, 14.1, 15.1, 53; 73/825, 818, 819, 822, 862.53, 1 R, 862.541, 862.55, 791, 862.06, 862.07, 865.9, 823, 829

[56] References Cited

U.S. PATENT DOCUMENTS

| | | | |
|---|---|---|---|
| 504,311 | 8/1893 | Davey | 264/40.5 |
| 4,177,517 | 12/1979 | Mette et al. | 364/559 |
| 5,004,576 | 4/1991 | Hinzpeter et al. | 264/40.5 |
| 5,087,398 | 2/1992 | Le Molaire et al. | 264/40.5 |
| 5,145,693 | 9/1992 | Hinzpeter et al. | 425/149 |
| 5,211,964 | 5/1993 | Prytherch et al. | 425/345 |
| 5,223,192 | 6/1993 | Hinzpeter et al. | 264/40.5 |
| 5,433,903 | 7/1995 | Hauser et al. | 264/37 |

FOREIGN PATENT DOCUMENTS

| | | |
|---|---|---|
| 0431269 | 9/1990 | European Pat. Off. . |
| 0 403 038 A2 | 12/1990 | European Pat. Off. . |
| 0 417 485 A2 | 3/1991 | European Pat. Off. . |
| 39 39 956 A1 | 6/1991 | Germany . |
| 6890883/6 | 2/1994 | Germany . |
| WO 93/09939 | 5/1993 | WIPO . |

OTHER PUBLICATIONS

Inaugural–Dissertation of Ulrich Tenter, 1986.

*Primary Examiner*—Emanuel T. Voeltz
*Assistant Examiner*—Hal P. Wachsman
*Attorney, Agent, or Firm*—Vidas, Arrett & Steinkraus, P.A.

[57] ABSTRACT

An apparatus and method for determining the force-displacement diagram of pairs of punches in a rotary pelleting machine involving measuring and storing the course of compression of punch pairs for each individual angle step, storing said data and preparing a correction table in a computer which is compared to the theoretical values of displacement.

5 Claims, 7 Drawing Sheets

METHOD AND APPARATUS FOR DETERMINING THE FORCE-DISPLACEMENT DIAGRAM OF THE PAIRS OF PUNCHES OF A ROTARY PELLETING MACHINE

The invention relates to a method for determining the force-displacement diagram of the punches in a rotary pelleting machine.

It is known to provide a rotor of a rotary pelleting machine with a number of upper and lower punches. During rotation of the rotor each punch is vertically displaced at predetermined positions of the circumference of the rotor (press stations). Thus, the punches are subject to varying forces. This is the case in a pre-press station, a main press station and also in a rejection station.

In accordance with the tablets to be pressed a predetermined pressing force is to be maintained. Normally, this force is exerted by means of stationary press rolls which engage on the heads of the punches.

From the EP 0 431 269 it has become known to monitor the maximum press forces of the punches for such pelleting machines. This monitoring takes place in order to determine failures and to reject tablets in time. The monitoring takes place further in order to make records for the quality of the tablets made. In the known method a disc or rotor including dies and rotating in common with the punches is permanently monitored with respect to its position by an angle encoder. A computer coordinates the maximum pulses for the pressing forces and the angular positions. The press rolls in the press stations are associated for instance with a load cell. The centered position of a pair of punches in the area of a pair of press rolls e.g. defines the zero or neutral point from which the pulses of the angle encoder are counted, with a predetermined number of pulses determines the position for the sucessive pair of punches centered with respect to the pair of press rolls according to the pitch of the die rotor. In this manner the maximum press force can be determined for each of the pairs of punches in a tablet or pelleting machine.

For a number of reasons it is desirable to know the compression characteristic of masses to be pressed. As to this, above all the force-displacement diagram is of considerable significance. Physically, the force-displacement diagram defines the quantitive course of the energy during the pelleting process. By means of the compression characteristic it can be concluded on the compression characteristic of defined substances and the properties of a tablet. The compression characteristic is essentially determined by the compression maintenance time, the condition of the granules (moisture, grain size distribution), pourability, lubrication etc. The properties of the tablets are defined by the mass of the tablet, the disintegration time, the release of the effective substance, abrasive wear etc.

Up to now only with particularly equipped pressing machines for research it was possible to judge the substances to be compressed under application of a force-displacement diagram. To this purpose the research machine has been equipped with a force measuring device and a device for measuring the displacement of the punch. In case of an eccentric press this can be easily done. The installation of displacement measuring devices in rotary tableting machines, however, is expensive. The transmission of the measured values can be carried out only by slip rings or contactless by means of a suitable transmitter device. For a production machine such expense is not reasonable.

It is possible to theoretically determine the displacement or path of a punch in a rotary press as described in "PreBkraft- und Weg-Zeit-Charakteristik von Rundlaufpressen", Inaugural-Dissertation of Ulrich Tenter. Due to different influences by the machine the actual displacements of the punches deviate from those theoretically calculated.

Therefore, it is an object of the invention to provide a method to detect the compression characteristics in a rotary pelleting machine with a minimal expense under production conditions.

In the method according to the invention the course of the compression force of at least a pair of punches is measured for the individual angle steps and stored in a computer. One revolution of the rotor e.g. corresponds to 3.600 angle pulses. Each of these pulses (one pulse=0.1° rotary angle of the rotor) is associated with a measured value for the force and is stored in the computer accordingly. Further, the theoretical values for the displacement of the punches are stored in the computer. These values can be calculated through corresponding geometric relations as explained in detail hereinafter. Specific for this theoretical value is the diameter of the press roll, the shape of the head of the punch and the position of the parts relative to each other.

Finally, a correction table is stored in the computer which considers essential influence factors on the actual displacement of the punches, e.g. the resiliency of the tableting press and the Hertzian surface press. The resiliency and the Hertzian surface press as well are depending upon the press force exerted by the press roll on the punch. Thus, force depending correction factors are determined which are to be deducted from the theoretical dates for the displacement of the punches in order to determine the actual displacement of a punch.

As the head of the punch has a radius only in the circumferential portion and has a plane surface in the center portion the magnitude of the Hertzian press is also depending upon the position of the head of the punch with respect to the press roll. In an embodiment of the invention the correction values consider also the dependency of the Hertzian press from the angular position of the punches.

It is conceivable to calculate the correction values for the Hertzian press and the amount of swell (resiliency) of the machine. It is, however, preferred to determine the correction values for the correction table empirically in that a given pair of punches is moved against each other for different feed values without a mass therebetween.

By means of a corresponding computer it is possible to scan and store the complete course of the force of all punches in relation to the angle pulses. In an equal manner also the displacements of the punches can be determined and related to the force values in order to make a force displacment calculation for a rotary pelleting press. By means of the invention it is thus possible to determine the compression characteristics of a rotary tableting machine under production condition with a minimum expense for measurement. These determined data can be compared with the values determined in the galenic research and to monitor them. As the complete amount of energy for the manufacturing of tablets yields from the energy in the pre-press station and the main press station, the calculation of the amount of energy can be also made during production.

It can be individually pre-selected whether only one pair of punches or a plurality of pairs of punches in series or predetermined pairs of punches are used during one or a plurality of revolutions of the rotor for the calculation and evaluation. Furthermore, it is possible to make intermediate measurements and evaluations for the main and/or the pre-press station and the rejection station as well.

The invention is explained along accompanying drawings.

Figure 1:
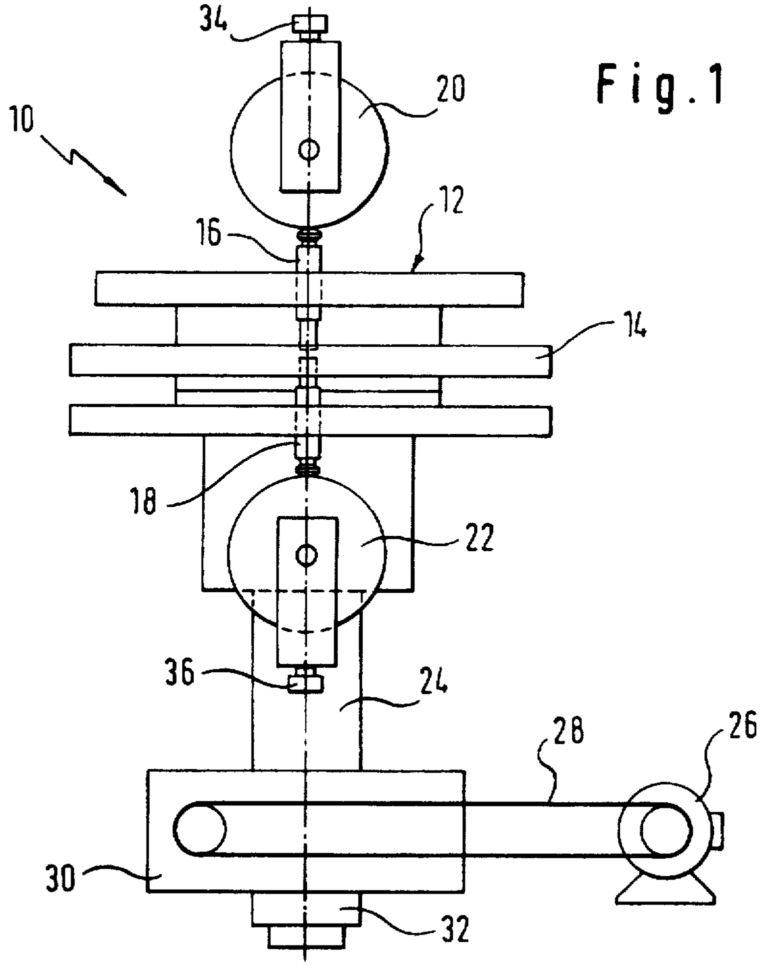
FIG. 1 shows diagrammatically a rotary press.

The tableting press 10 in FIG. 1 is illustrated by its rotor 12 with a disc 14 including the dies (not shown). From the number of press punches for rotor 12 only a pair of punches is shown with an upper punch 16 and a lower punch 18 in the area of an upper press roll 20 and a lower press roll 22. Rotor 12 is driven by an electrical motor 26 through a shaft 24, a belt 28 and a gear arranged between motor 26 and shaft 24. An angle encoder 32 is sitting on shaft 24. The support means for the press rolls 20, 22 cooperate with a load cell 34, 36 in order to measure the force which exists between press roll and punch when punches 16, 18 are travelling between the press rolls 20, 22. As known, these carry out the pre- and the main compression of the mass to be pressed in disc 14 in order to form a tablet or the like.

Figure 2:
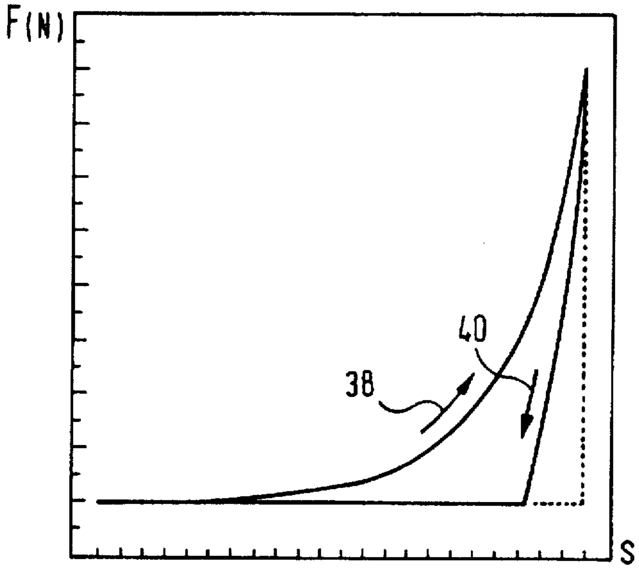
FIG. 2 shows a force-displacement diagram for a punch of the press of FIG. 1.

In FIG. 2 the force-displacment diagram of a punch, e.g. of punch 16 is shown during its travel under press roll 20. Arrow 38 indicates the ascending and arrow 40 the descending portion of the diagram. Due to the compressibility of the press material and the spring back of the material to be pressed and of the machine itself a hysteresis is formed as indicated by the surface of the diagram.

Figure 3:
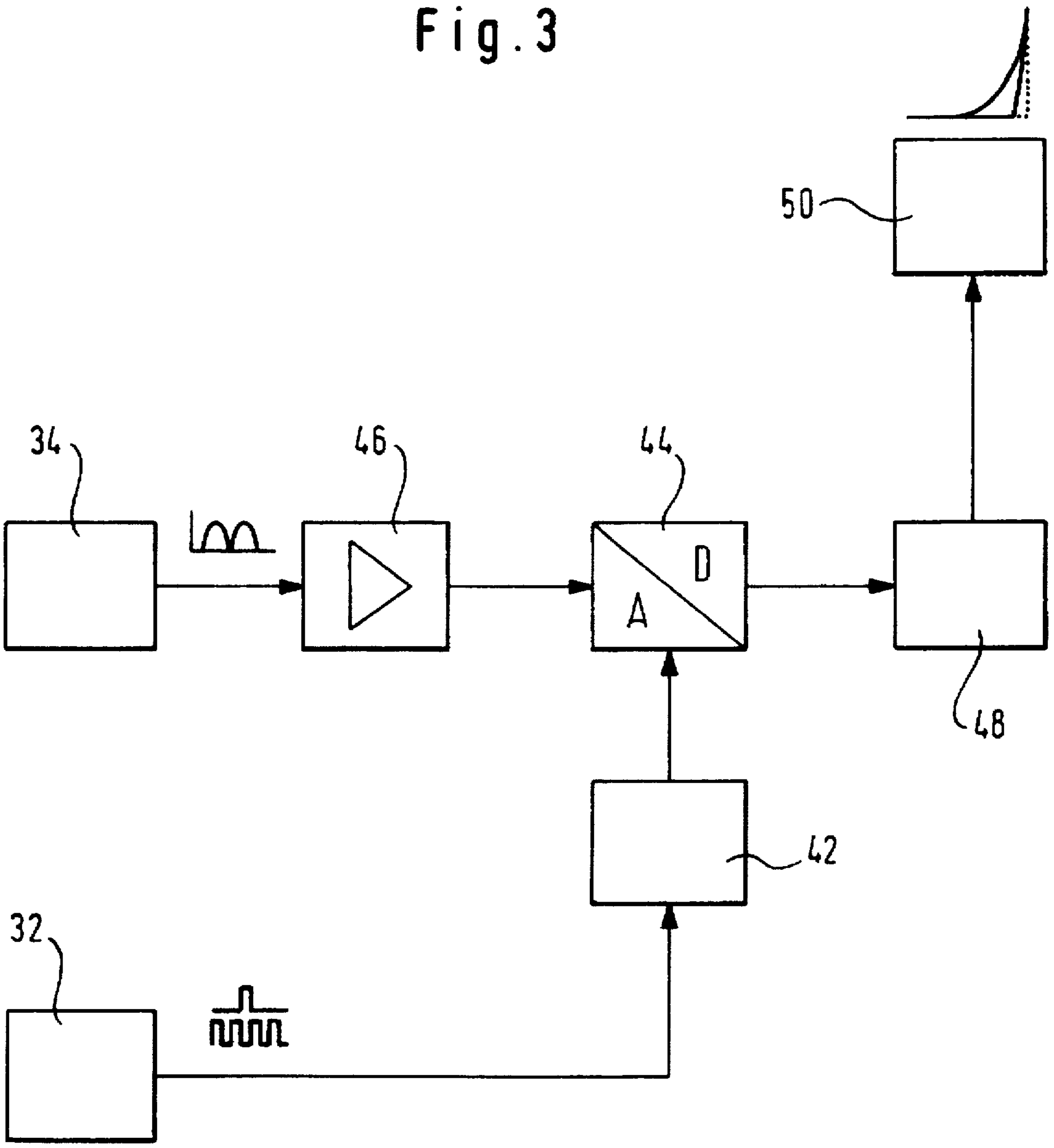
FIG. 3 shows a block diagram for the determination of the force-displacement diagram of FIG. 2.

In FIG. 3 it is indicated that an angle encoder 32 during rotation of rotor 12 generates a chain of pulses, e.g. one pulse per 0,1° revolution. Furthermore, a starting pulse which is defined by the central position of a pair of punches relative to the pair of press rolls is generated.

The pulses are transmitted to an evaluation means 42 and from there to an analog digital converter 44. In FIG. 3 it is further depicted that a load sensor 34 is connected also with the analog digital converter 44 through an amplifier 46. The output of the analog digital converter is connected with a machine processor 48. A service computer 50 is connected to the machine computer 48 by which the force-displacment diagram of FIG. 2 is to be generated in a manner to be described hereinafter.

Figure 4:
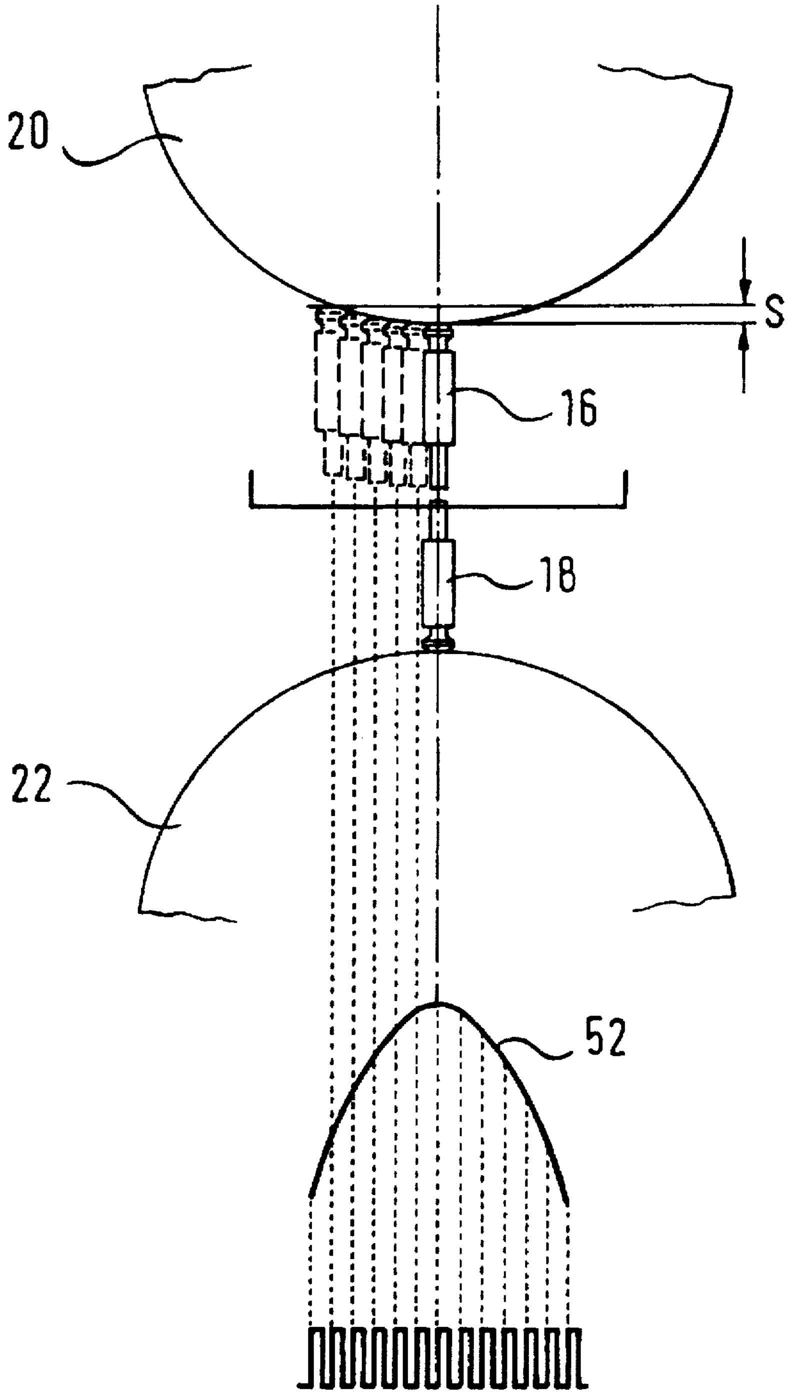
FIG. 4 shows different horizontal and vertical positions of a punch through a predetermined rotational angle of the rotor of the press of FIG. 1.

In FIG. 4 it can be seen that punch 16 during its horizontal movement relative to the stationary roll 20 is displaced about a vertical path s. The load cell 34 determines per angle step which is defined by the pulse chain of the angle encoder 32 a value for the force measured. The course of the force during path s is indicated at 52 in FIG. 4. For generating the force-displacement diagram it is also necessary to determine the actual path of the punch during its movement along travels. The theoretical path can be calculated in dependence of the rotational angle by the following formula:

$$s(\alpha) = 2 \cdot \frac{s}{2}(\alpha),$$

with s being the angle-dependent path and α the rotational angle of rotor 12.

Figure 5:
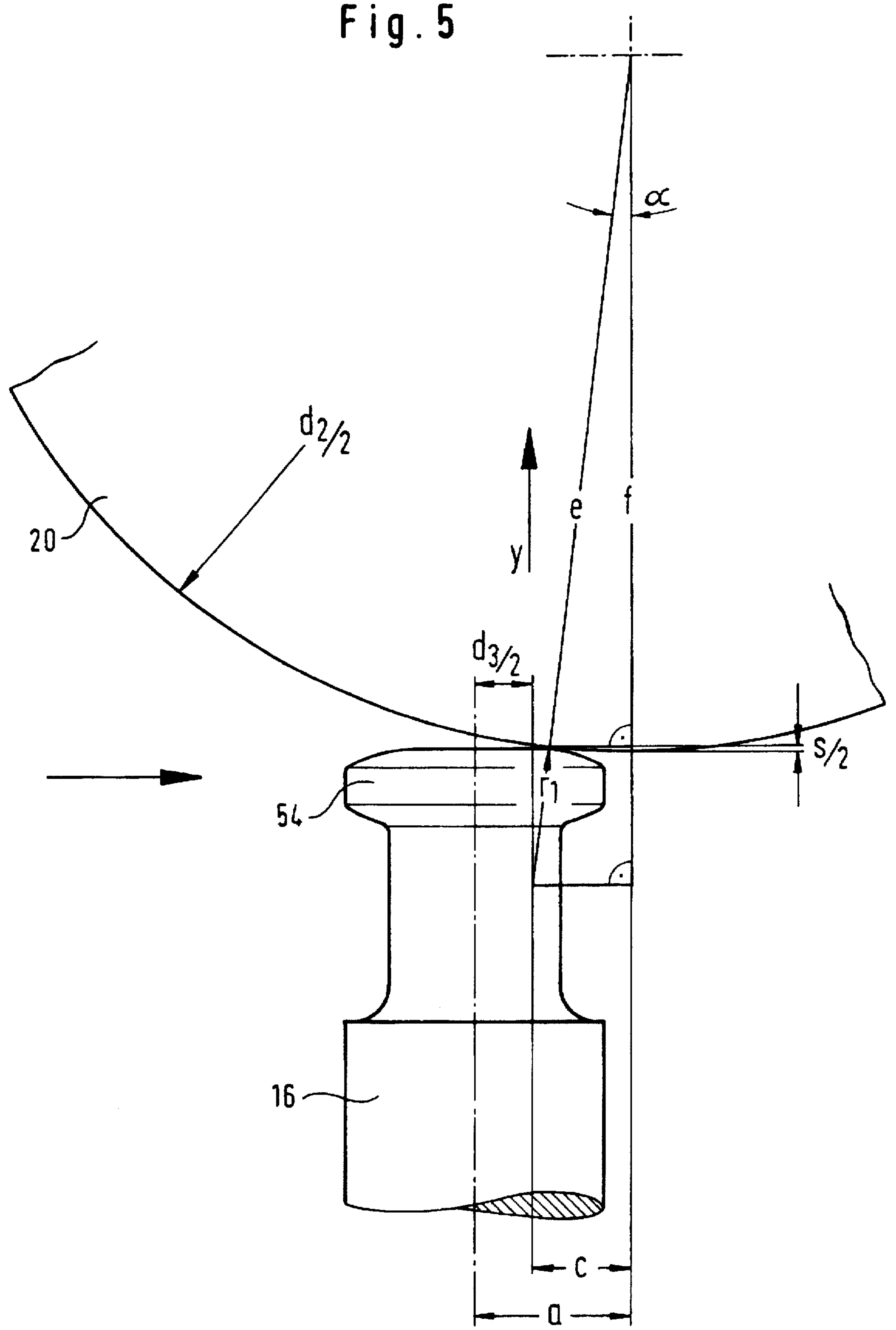
FIG. 5 shows the geometric relations between a press roll and a press punch of the press of FIG. 1.

From FIG. 5 the geometric relations between press roll 20 and head 54 of punch 60 can be seen more clearly. For the absolute value the following formula is to be applied:

$$\frac{s}{2}(\alpha) = f - e,$$

with the units f and e yielding from FIG. 5 and e being the radius of press roll 20. The units f, e and c yield a triangle, therefore:

$$e^2 = c^2 + f^2 \text{ and } f = \sqrt{e^2 - c^2}$$

further:

$$e = \frac{d_2}{2} + r_1 \text{ and } c = a - \frac{d_3}{2}$$

From the above the following formula can be derived:

$$f = \sqrt{\left(\frac{d_2}{2} + r_1\right)^2 - \left(a - \frac{d_3}{2}\right)^2}$$

Figure 6:
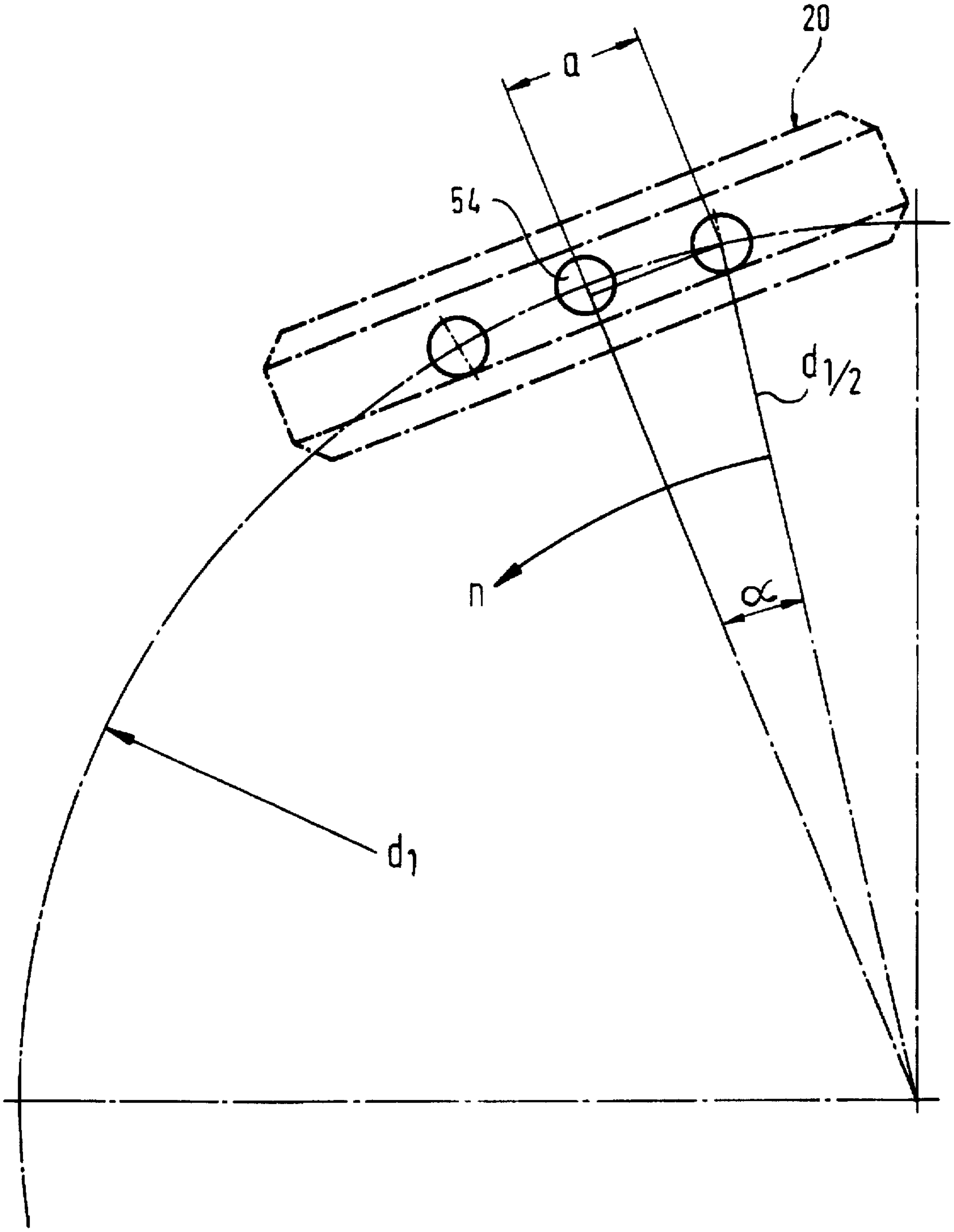
FIG. 6 shows diagrammatically a plan view on the rotor of the press of FIG. 1 in the area of a press roll.

The geometric unit a is indicated in FIG. 6 in dependence of the diameter $d_1$ of the pitch circle and the rotational angle α.

Thus:

$$\sin\alpha = \frac{a}{d_{1/2}} \rightarrow a = \frac{d_1}{2} \cdot \sin\alpha$$

From the above it can be derived:

$$f = \sqrt{\left(\frac{d_2}{2} + r_1\right)^2 - \left(\frac{d_1}{2} \cdot \sin\alpha - \frac{d_3}{2}\right)^2}$$

Therefore, for each rotational angle α the vertical movement of a pair of punches can be calculated. In the present case the rotational angles are selected in steps of 0,1° in accordance with the pulse spacing of the pulses of the angle pulse encoder 32. This theoretical total path must be corrected, i.e. by the total resiliency of the pelleting press and by the Hertzian surface press between the head of the punch and the press roll.

When calculating the flattening of the head of the punch and of the press roll due to the Hertzian press two areas have to be differentiated, namely the circular plane center portion of the punch head and the marginal portion which has a radius $r_1$ in cross section. For the latter portion the following equation is valid:

$$y_2 = 1{,}23\sqrt[3]{\frac{F^2 * 1/r}{E^2}}$$

with f being the pressure or force, 1/r the sum of of the radii and e the common E module of the engaging materials. The sum 1/r can be derived as follows:

$$1/r = 1/r_1 + 1/r_2$$

with $r_1$ defining the radius of a ball in the circumferential area of the punch head and $r_2$ a circle in this area.

$$r_2 = \frac{r_a + r_s}{2}$$

$$1/r = 1/r_1 + \frac{1}{\frac{r_a + r_s}{2}}$$

with $r_a$ being the outer diameter of the punch head and $r_s$ the inner diameter of the rounded outer portion of the punch head.

The force or pressure f is depicted in angle pulses $\alpha = x \cdot \frac{1}{3600}°$ (0,1° steps).

In the inner portion the punch head 54 contacts press roll 20 with a mirror surface and therefore effects a linear engagement. The flattening is calculated along the following equation:

$$y_2 = \frac{0{,}398}{10^4} * \frac{F^{0.925}}{L\ \mathrm{eff}^{0.85}}$$

with F being the press force and L eff. the supporting length of the mirror surface.

The press force is illustrated similar to the upper description. The amount for L eff. is calculated as follows:

$$L\ \mathrm{eff.} = 2\sqrt{(r_s^2 - a^2)}$$

with $r_s$ being the radius of the mirror surface. For the flattening the following equation is applicable:

$$y_2 = \frac{0{,}398}{10^4} * \frac{F^{0.925}}{2\sqrt{\left[ r_s^2 - \left( \frac{d_1}{2} \sin\alpha \right)^2 \right]}}$$

The resiliency of the machine comprises the following individual components:

Compression of punches, press rolls and the bearings of the press rolls

Bending of the housing

Removing of individual tolerances for the bearings

Tension, bending and torsion of the columns of the machine

It is assumed that except the lowermost area the resiliency is according to the law of Hook. Therefore: $Y_3=f(F)$ and $F=f(\alpha)$.

F means the press force and $\alpha$ the position of the punch relative to the press roll. Therefore:

$$y_3 = x \cdot F$$

Due to the complex consideration the factor x can be only determined empirically for each type of machine and each possible equipment.

The actual travel path for the first area, therefore, is the theoretical value indicated above minus the flattening in the first area minus the resiliency (spring back). The same is valid for the path or displacement of the punch in the second portion of the head of the punch. The corresponding equations are no longer indicated.

In practice the correction values calculated above are determined empirically. This happens in the following manner.

Figure 7:
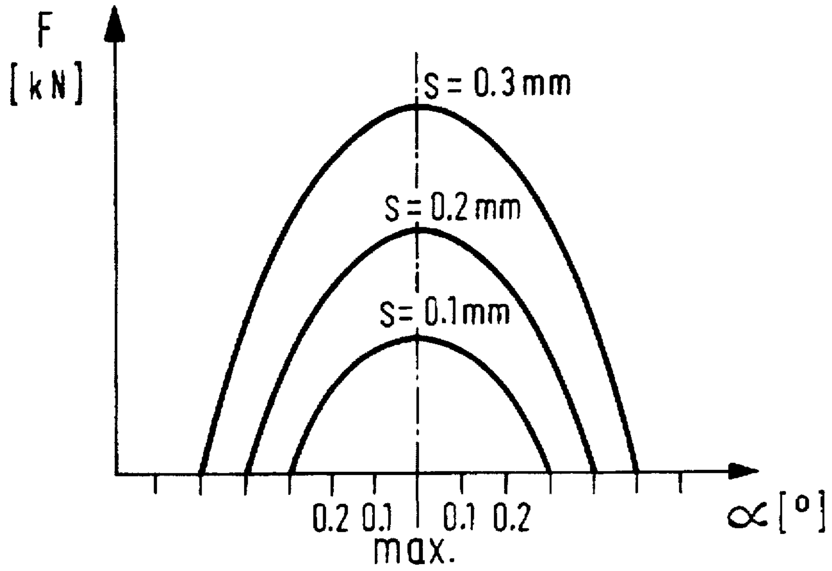
FIG. 7 shows a force-angle diagram for different feed values.
Figure 8:
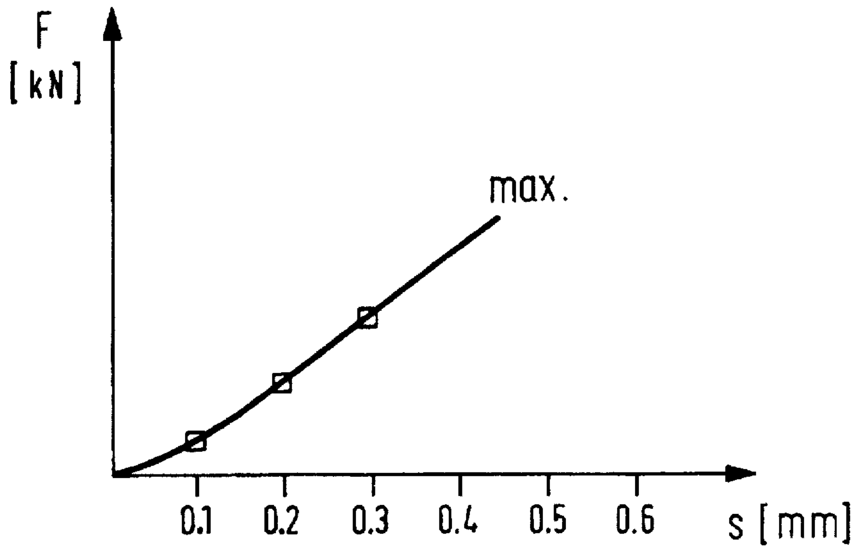
FIG. 8 shows a force-correction-displacement diagram derived from the diagram of FIG. 2.

A pair of measuring punches is mounted in the tablet press and feed against each other without a mass to be pressed therebetween. By adjustment of the height (of a tablet) for the pair of punches (feed by 0,1 mm steps) different force-angle-curves are generated as shown in FIG. 7. In FIG. 7 s means the feed of the press rolls. It is understood that the maxima of the forces increase with increasing S. Thereafter, the maxima are inserted in a force-correction-displacement diagram of FIG. 8. By means of the diagram of FIG. 8 the correction of the theoretically calculated total value can be carried out. In the embodiment of FIG. 3 this takes place in the form of a table for the values. In the service computer the theoretical paths of the press punches are stored which yield from the calculations above. Furthermore, the values for the correction table according to diagram of FIG. 8 are stored so that with a given force a given correction value is deducted from the theoretical value for the punch.

Figure 9:
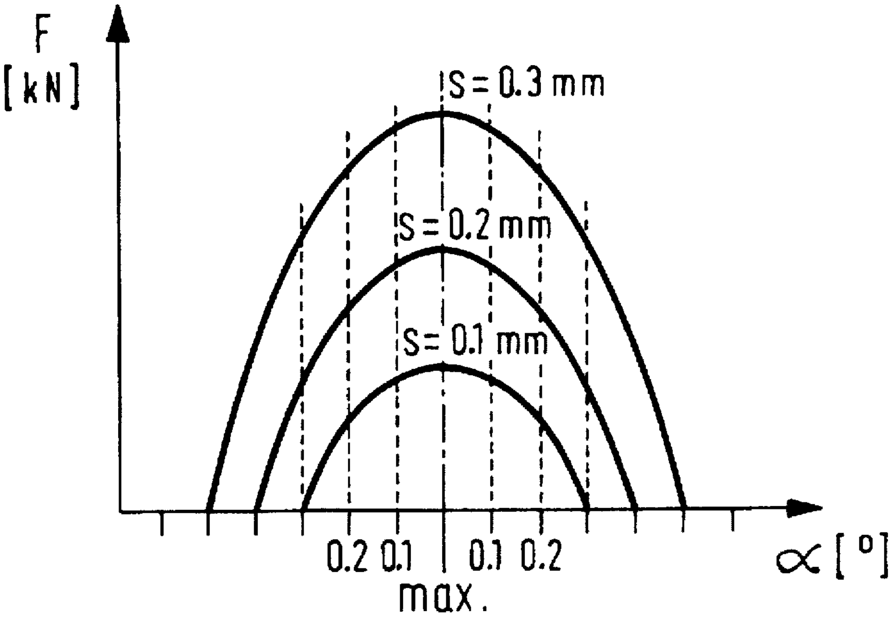
FIG. 9 shows a force-angle diagram similar to that of FIG. 7.
Figure 10:
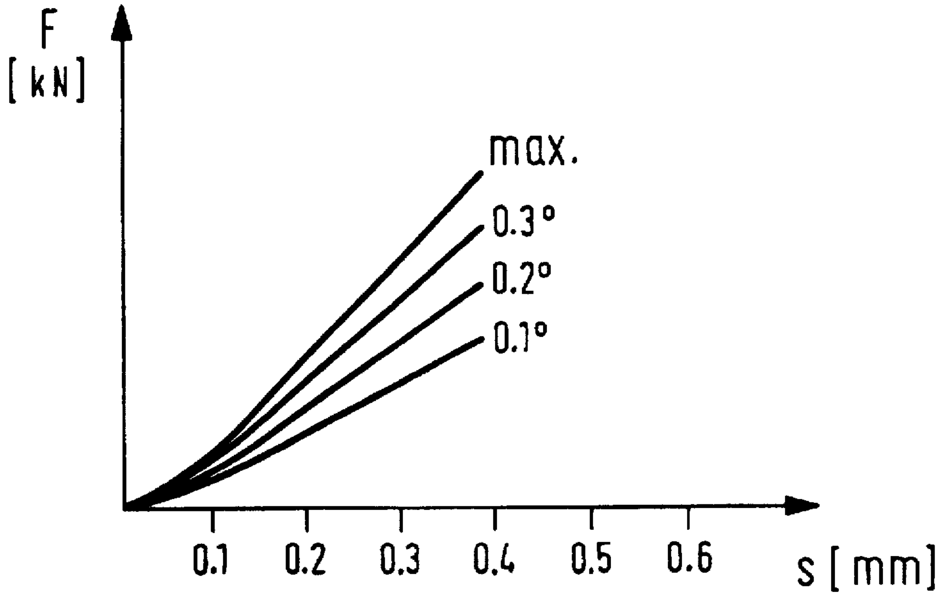
FIG. 10 shows a force-correction-displacement diagram derived from the diagram of FIG. 9.

The correction described above may be not sufficient since it is only correct for the Hertzian press in the area of the maximum. Thus, the correction value indicated above must be subject to a further optimizing. In the area of the maximum of the press force press roll 20 contacts head 54 along a line which corresponds to the mirror diameter of the punch head. Prior thereto and thereafter the line becomes gradually shorter and finally becomes a point contact. Accordingly, the elastic penetration depth of the press roll in the head of the punch varies. Therefore, by means of the computer not only the maxima of the forces are determined, rather also the force values for the 0,1° steps for the different feed values as shown in FIG. 9. Considering that the geometric shape of the press roll and of the head of the punch is known for these forces the penetration depth for the individual angle steps are determined according to the Hertzian press. The original correction value is then corrected by the deviation of these values from the maximum values. These values then are inserted in the force-correction diagram. In FIG. 10 such a correction diagram is depicted. Depending upon the fact at which angle step a correction has to be carried out one of the curves shown in FIG. 10 is selected. It is understood that the correction diagram of FIG. 10 is stored in the service computer 50 in the form of a correction value table.

We claim:

1. A method for determining the force-displacement diagram of the pairs of punches of a rotary pelleting machine, said punches having a head, wherein the press forces on said punches are measured when the head of said punches are engaged by press rolls in a press station of said machine, and wherein an angle encoder determines the position of the punches in rotational direction, a computer computing the signals of said angle encoder and relating them to the press forces of the punches, characterized by the following method steps:

the press forces of the punches of at least a pair of punches is measured for each angle step of said angle encoder, and the values for the press forces are stored in said computer;

owing to the geometry of said press rolls, said head of said punches and the position of said head of said punches and said press rolls, a theoretical value for the vertical displacement of each of the pairs of punches are calculated for each angle step of said angle encoder and stored in said computer;

a force-displacement correction table is stored in said computer which represents an influence of a Hertzian surface pressing between said punch head and said press roll and of the resiliency of said machine on all actual vertical path of each of said pairs of punches in dependence of said press forces; and the computer reduces the theoretical values of displacement of each of said pairs of punches for the individual angle steps by the corresponding correction value of the correction table.

2. The method of claim 1, wherein the correction values also indicate the dependency of an Hertzian press in correspondence with the angular position of the press punches.

3. The method of claim 1, wherein the correction values of the correction table are empirically determined in that a selected pair of punches is fed against each other without a mass to be pressed therebetween for different feed values.

4. An apparatus for determining the force-displacement diagram of the pairs of punches of a rotary pelleting machine, said punches having a head, wherein the press forces on said punches are measured when the head of said punches are engaged by press rolls in a press station of said machine, and wherein an angle encoder determines the position of the punches in rotational direction, said apparatus including a computer computing the signals of said angle encoder and relating them to the press forces of the punches, said apparatus further including:

(a) means for measuring the press forces of the punches of at least a pair of punches for each angle step of said angle encoder, and for storing the values for the press forces in said computer;

(b) means for calculating a theoretical value for the vertical displacement of each of the pairs of punches for each angle step of said angle encoder and for storing same in said computer;

(c) means for storing a force-displacement correction table in said computer which represents an influence of a Hertzian surface pressing between said punch head and said press roll and of the resiliency of said machine on an actual vertical path of said pair of punches in dependence of said press forces; and (d) means for reducing the theoretical values of displacement of each of said pairs of punches for the individual angle steps by the corresponding correction value of the correction table.

5. A tableting machine comprising:

(a) a rotor driven by an electric motor about a vertical axis and having a number of dies in the form of throughgoing openings, with the axis thereof being parallel to the rotational axis of said rotor;

(b) upper punches above and lower punches below said rotor, said punches having a press portion and a head and are moved together with said rotor, the number of said punches corresponds to that of said dies;

(c) at least one upper and at least one lower press roll rotatably supported about a horizontal axis such that upon moving of said punches along said press rolls, said press rolls engage said head of said punches and push said punches towards the interior of said dies;

(d) force measuring means associated with at least a pair of an upper and a lower punch;

(e) an angle encoder associated with said rotor or said motor, respectively, which generates a train of pulses during rotation of said rotor in order to detect the angular position of said rotor and thus of said pair of punches;

(f) computer means connected to said force measuring means and said angle encoder to receive measured force values by each step of said angle encoder, said computer means including an algorithm which is derived from the geometrical conditions of said machine and by which theoretical values for the displacement of each of said pairs of punches can be calculated for each angular step of said rotor; and (g) a correction function being stored in said computer means by which said computer recomputes the theoretical displacement values of each of said pairs of punches under consideration of influences of a Hertzian surface pressing between said punch head and said press rolls and of the resiliency of said machine on an actual vertical path of said pair of punches in dependence of said forces so that actual force-displacement-values of said pair of punches is obtained.

* * * * *

UNITED STATES PATENT AND TRADEMARK OFFICE
CERTIFICATE OF CORRECTION

PATENT NO. : 5,699,273

DATED : Dec. 16, 1997

INVENTOR(S) : Jürgen Hinzpeter et al

It is certified that error appears in the above-identified patent and that said Letters Patent is hereby corrected as shown below:

Col. 6, line 67, delete "all" and insert -- an --.

Signed and Sealed this

Third Day of March, 1998

Attest:

BRUCE LEHMAN

*Attesting Officer* *Commissioner of Patents and Trademarks*